(12) United States Patent
Beraud et al.

(10) Patent No.: US 9,695,533 B2
(45) Date of Patent: Jul. 4, 2017

(54) INTERMEDIATE MATERIAL INTENDED TO LIMIT THE MICROCRACKING OF COMPOSITE PARTS

(75) Inventors: Jean-Marc Beraud, Rives (FR); Patrick Henrat, Villeurbanne (FR)

(73) Assignee: Hexcel Reinforcements, Dagneux (FR)

( * ) Notice: Subject to any disclaimer, the term of this patent is extended or adjusted under 35 U.S.C. 154(b) by 511 days.

(21) Appl. No.: 13/132,714

(22) PCT Filed: Dec. 8, 2009

(86) PCT No.: PCT/FR2009/052441
§ 371 (c)(1),
(2), (4) Date: Sep. 23, 2011

(87) PCT Pub. No.: WO2010/067003
PCT Pub. Date: Jun. 17, 2010

(65) Prior Publication Data
US 2012/0100354 A1   Apr. 26, 2012

(30) Foreign Application Priority Data

Dec. 9, 2008   (FR) ...................................... 08 58378

(51) Int. Cl.
*B32B 7/02* (2006.01)
*B29C 70/04* (2006.01)
(Continued)

(52) U.S. Cl.
CPC .............. *D04H 3/115* (2013.01); *B29B 11/16* (2013.01); *B32B 5/024* (2013.01); *B32B 5/026* (2013.01);
(Continued)

(58) Field of Classification Search
CPC ........ D04B 21/165; D04H 3/115; D04H 3/02; D01B 2403/02412; D01B 2505/02;
(Continued)

(56) References Cited

U.S. PATENT DOCUMENTS 4,876,128 A * 10/1989 Zafiroglu ................. D04H 1/52
                                                              28/112
4,913,937 A    4/1990 Engdahl et al.
(Continued)

FOREIGN PATENT DOCUMENTS

EP    175998      1/2002
EP    1473132    11/2004
(Continued)

OTHER PUBLICATIONS

Free Online Dictionary.*

*Primary Examiner* — Camie Thompson
(74) *Attorney, Agent, or Firm* — W. Mark Bielawski; David J. Oldenkamp (57) ABSTRACT

The invention relates to an intermediate product intended for the production of a composite part in combination with a resin matrix, formed by at least two unidirectional sets of reinforcing yarns, the yams of each set extending in a different direction, whereby the sets are interlinked by means of stitching or knitting using at least one stitching or knitting yarn. The invention is characterized in that the stitching or knitting yarn has a yarn count of less than or equal to 30 dTex, preferably less than or equal to 25 dTex, in accordance with standard EN ISO 2060.

19 Claims, 7 Drawing Sheets (51) Int. Cl.
  *D04B 1/00* (2006.01)
  *D04H 3/115* (2012.01)
  *B29B 11/16* (2006.01)
  *B32B 5/08* (2006.01)
  *B32B 5/26* (2006.01)
  *B32B 7/08* (2006.01)
  *D04H 3/04* (2012.01)
  *D05B 1/06* (2006.01)
  *D04B 21/16* (2006.01)
  *B32B 5/02* (2006.01)
  *D04H 3/002* (2012.01)

(52) U.S. Cl.
  CPC .............. *B32B 5/08* (2013.01); *B32B 5/26* (2013.01); *B32B 7/08* (2013.01); *D04B 21/165* (2013.01); *D04H 3/002* (2013.01); *D04H 3/04* (2013.01); *D05B 1/06* (2013.01); *B32B 2260/021* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/101* (2013.01); *B32B 2262/105* (2013.01); *B32B 2262/106* (2013.01); *B32B 2307/52* (2013.01); *B32B 2307/718* (2013.01); *D10B 2403/02412* (2013.01); *D10B 2505/02* (2013.01); *Y10T 428/24942* (2015.01); *Y10T 442/608* (2015.04)

(58) Field of Classification Search
  CPC . B32B 2307/52; B32B 7/08; B32B 2262/101; B32B 2262/105; B32B 2262/106; D05B 1/06
  USPC ............ 428/102–105; 112/402, 440; 156/93
  See application file for complete search history.

(56) References Cited

U.S. PATENT DOCUMENTS

| | | | | |
|---|---|---|---|---|
| 5,133,178 | A | * | 7/1992 | Buchert et al. ............... 57/241 |
| 5,809,805 | A | * | 9/1998 | Palmer et al. ............... 66/84 A |
| 2004/0113317 | A1 | * | 6/2004 | Healey et al. ............... 264/292 |
| 2005/0059309 | A1 | | 3/2005 | Tsotsis |

FOREIGN PATENT DOCUMENTS

| | | | |
|---|---|---|---|
| JP | 62-299537 | * | 6/1986 |
| JP | 2004160927 | | 6/2004 |
| JP | 2008095211 | | 4/2008 |
| WO | 98/10128 | | 3/1998 |

* cited by examiner

Fabric
ex. 1
Non-stitched multiaxial

| Yarn | Distance (mm) | | |
| --- | --- | --- | --- |
| | Major Axis | Minor Axis | Yarn size along major axis |
| Phenoxy 150 dTex | / | / | / |
| Polyester 76 dTex | 2.20 +/- 0.20 | 0.18 +/- 0.02 | 0.20 +/- 0.10 |
| Polyester 49 dTex | 3.50 +/- 0.70 | 0.20 +/- 0.10 | 0.30 +/- 0.03 |
| Polyester 35 dTex | 3.1 +/- 0.50 | 0.12 +/- 0.06 | 0.26 +/- 0.06 |
| Polyester 23 dTex | 2.44 +/- 0.40 | 0.10 +/- 0.01 | 0.18 +/- 0.01 |

FIG. 13

INTERMEDIATE MATERIAL INTENDED TO LIMIT THE MICROCRACKING OF COMPOSITE PARTS

The invention concerns the technical field of reinforcement materials adapted to the creation of composite parts. More specifically, the invention concerns a new intermediate material for creating composite parts, notably by subsequent injection or infusion of a thermosetting resin, a process for the fabrication of composite parts from such a material, as well as the obtained composite parts.

The fabrication of composite parts or goods, that is, those containing on one hand one or several reinforcements or fibrous layers, and on the other hand, a primarily thermosetting ("resin") matrix that could include thermoplastics, and can for instance be created by a process called "direct" or "LCM" (from the English "Liquid Composite Molding"). A direct process is defined by the fact that one or several fiber reinforcements are prepared in a "dry" state (that is without the final matrix), the resin or the matrix being prepared separately, for instance by injection into the mold containing the reinforcement fibers ("RTM" process, from the English Resin Transfer Molding), by infusion through the thickness of the reinforcements fibers ("LRI" process, from the English "Liquid Resin Infusion" or "RFI" process, from the English "Resin Film Infusion"), or else by manual coating/impregnation with a roller or brush on each of the unit layers of reinforcement fibers, applied successively on the mold.

For the RTM, LRI or RFI processes, it is generally first necessary to build a fibrous preform of the mold of the desired finished product, then to impregnate this preform with a resin. The resin is injected or infused by pressure differential at temperature, then once all the amount of necessary resin is contained in the preform, the assembly is brought to a higher temperature to complete the polymerization/reticulation cycle and thus cause its hardening. The matrix used is thermosetting. The injected resin is for example selected among the following thermosetting polymers: epoxies, unsaturated polyesters, vinyl esters, phenolics, polyimides, bismaleimides.

The composite parts used in the automobile, aviation or naval industry, are particularly subject to very strict requirements notably in terms of their mechanical properties. It is therefore particularly important to use materials that on one hand are highly consistent, and on the other are easy to handle and process.

Materials called multiaxial or "NCF" ("Non Crimp Fabrics" in English), have been developed in this context. These materials consist of a stack of unidirectional yarn layers, the unidirectional layers being produced by orienting the layer yarns so as to obtain fibers within the composite part, oriented in directions at an angle of 0°, 30°, 45°, 60°, 90°, 120° or 135° for example, with respect to the main axis of the part. The layers of carbon yarns thus deposited along the selected orientations are attached to each other by stitching or knitting with a stitching or knitting yarn. Such stitched layers produced from carbon yarns containing between 3,000 and 24,000 carbon filaments (3 K and 24 K) are, for example, marketed by Sigmatex UK Limited (Cheshire WA7 1TE, England) as MC8021270 (four layer quadriaxial of 268 g/m² stitched with an 80 dTex yarn). The purpose of the stitching yarn is simply to maintain the different layers together, in order to form a manipulable intermediate product.

Such a stitching or knitting binding method limits the expansion of the yarns within the layers at the stitching or knitting, whose effect is to create separation zones between the reinforcement yarns. One consequence of this effect is an increase in the transverse permeability of the material, when combined with a resin matrix during the production of composite parts. This therefore favors the implementation of such an intermediate material, notably by LRI or RFI.

However, it was found that parts made with such intermediate materials had microcracks under hygrothermal cycling likely to affect the durability of structures. By the same token, during its lifetime, an aircraft structure is subjected to thermal cycles and humid periods (parking in a hot desert, high altitude flight in extreme cold, moisture absorption during static ground periods, for example during maintenance, drying during flights . . . ). Such an effect may render the use of prior art multiaxials poorly suited for such applications.

The invention therefore aims to present a novel intermediate product based on unidirectional layers that make it possible to limit the appearance of microcracks in subsequently produced composite parts, when the latter are subjected to hygrothermal stresses.

The intermediate product according to the invention must also be easily manipulated and be manufactured easily and inexpensively.

In this context, the objective of the invention is an intermediate product for the creation of a composite part by association with a thermosetting resin matrix, consisting of at least two unidirectional reinforcing yarn layers, the yarns of each of the two layers extending in different directions, in which the layers are attached together by stitching or knitting using at least one stitching or knitting yarn, characterized in that said stitching or knitting yarn has a count of less than 30 dTex, preferentially less than or equal to 25 dTex, determined according to the EN ISO 2060 standard. In the context of the invention, the EN ISO 2060 standard refers to its June 1995 version and the yarn count measurements are made using Variant 1, based on an unwashed yarn, the weight of the yarn being conditioned in equilibrium with the standard testing environment.

Examples of a material constituting the stitching yarn, particularly suitable for the invention, include polyesters (PET), polypropylenes (PP), polyethylenes (PE), polyphenylene sulfides (PPS), polyethylene naphthalates (PEN), liquid crystal polymers (LCP), polyketones, polyamides, carbon, glass, basalt, silica, and mixtures thereof. Polyethylene terephthalate, polybutylene terephthalate, trimethylene terephthalate, polylactic acid and copolymers thereof are examples of polyesters that can be implemented. An example of polyketones can include PEEK, and PEKK. An example of polyamide with low moisture absorption includes PA 6.10 and PA 6.12. Indeed, it could be interesting for the stitching or knitting yarn to consist of a material having a moisture absorption factor of less than or equal to 0.4% as determined by ASTM D629-99 (paragraph 9). Similarly, the invention is even more advantageous when the knitting or stitching yarn consists of a material insoluble in the resin matrix at the creation temperatures of the composite part, since the material yarns insoluble in the resin matrix are less conducive to the formation of resin-rich zones, where the microcracks occur under hygrothermal stress.

Moreover, the stitching or knitting yarn can, for example, have a fracture toughness between 20 cN/Tex and 100 cN/Tex. as measured according to ISO EN 2062 in its 1995 version. According to some embodiments, the stitching or knitting yarn can have an elongation at rupture between 10% and 60%, as measured according to ISO EN 2062 in its 1995 version.

In a preferred way as well, the stitching yarns being used have been washed and will not contain surface lubrication or oil, or at most will have a lubrication weight ratio lower than 1.3%. Existing lubrication is preferably mineral and, advantageously, does not contain silicone or silicone derivatives.

As an example of a particular embodiment, the stitching yarn can be a yarn of 23 dTex of the polyester family.

Equally, an objective of the invention is a manufacturing process for a composite part comprising a step of addition, notably by infusion or injection, of a thermosetting resin to an intermediate material according to the invention, then a step of hardening the desired part by polymerization/reticulation in a cycle of defined temperature and pressure, followed by cooling.

Composite parts produced, at least in part, by the association of an intermediate product according to the invention with a thermosetting resin matrix, and likely to be obtained by such a process, are an integral part of the invention.

Such composite parts are characterized by small resin-rich zones at the stitching yarns, which minimizes the microcracks under cyclic hygrothermal loading. Indeed, it was found as part of the invention, that using stitching yarns with the lowest possible count made it possible to reduce, around the stitching yarns, the zones that do not contain reinforcement fibers, and where the first microcracks occur when the part is subjected to hygrothermal stresses. These zones that do not contain reinforcement fibers around the stitching yarns are called "resin-rich areas". Notably, the resin-rich zones on the parts obtained, exhibit an average height of at most 0.11 mm, measured in a plane parallel to the unidirectional layers of the intermediate product and located at the middle of the intermediate product.

Various other characteristics emerge from the following description referring to the appended drawings.

The invention is particularly suitable for intermediate materials produced with unidirectional layers of reinforcement fibers of a material selected among carbon, glasses, basalts, aramides, silicas, ceramics, and mixtures thereof. The fibers may be natural or synthetic. The usable ceramics are notably silicon carbide and refractory oxides, such as alumina and zirconia. The carbon used in the aviation field is nevertheless preferred.

Each layer of yarns consists of yarns extending parallel to each other. A yarn is generally composed of an assembly of fibers or filaments and in general contains 1,000 to 80,000 filaments in the case of carbon yarns, and usefully 12,000 to 24,000 filaments. Particularly preferred for use in the context of the invention are 1 to 24 K carbon yarns, and preferentially 12 and 24 K. The constituent fibers can be discontinuous, cracked, or preferably continuous. The yarns used generally have an essentially circular transversal cross-section (qualified as round yarns) or, preferably, are essentially parallelepipedic or elliptical (qualified as flat yarns). These yarns have a certain width and thickness. A flat carbon yarn of 3,000 to 24,000 filaments for instance, will most often have a width of 1 to 12 mm. Among the carbon yarns are the High Resistance (HR) yarns whose tension modulus is between 220 and 241 GPa and whose tension stress rupture is between 3450 and 4830 MPa, the Intermediate Modulus (IM) yarns whose tension modulus is between 290 and 297 GPa and whose tension stress rupture is between 3450 and 6200 MPa, and the High Modulus (HM) yarns whose tension modulus is between 345 and 448 GPa and whose tension stress rupture is between 3450 and 5520 Pa (from "ASM Handbook", ISBN 0-87170-703-9, ASM International 2001). In the unidirectional layers, carbon strands are preferably not associated with a polymeric binder and are therefore qualified as dry, meaning that they are neither impregnated nor lubricated with any polymeric binder. The carbon fibers are, however, most often characterized by a standard lubrication weight ratio that can represent at most 2% of their weight, but such fibers remain qualified as dry.

Figure 1:
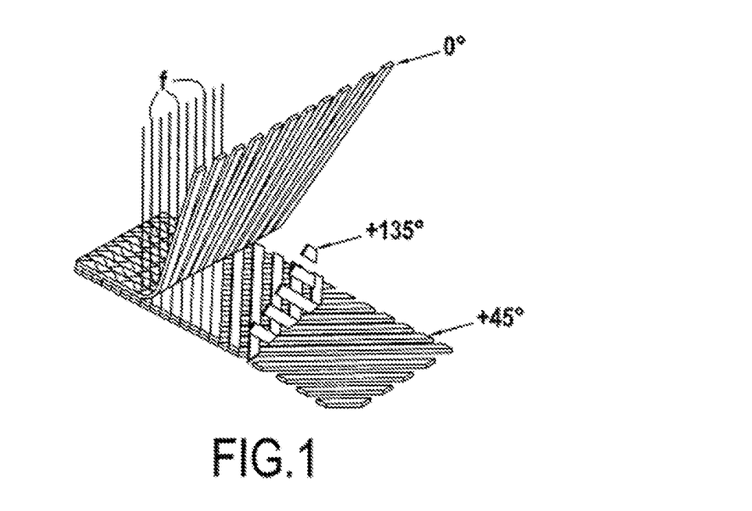
FIG. 1 is an exploded perspective view of an intermediate product according to the invention, composed of a 3-layer 45°/135°/0° stitched multiaxial.

The unidirectional layers are composed of a set de yarns extending in each layer along the same direction, as for instance, illustrated in FIG. 1. The yarns are positioned so as to assure quasi-total coverage over the entire surface of the layer. In each of the layers constituting the intermediate material, the yarns are positioned edge to edge, minimizing or avoiding any material gap ("gap" in English) or overlap ("overlap" in English). In the rest of the description, a unidirectional layer is also called a ply, without further explanation, while it constitutes of course a specific ply in which the yarns are all parallel to each other.

In one particular embodiment, applicable to all variations described above and below, the surface density of each constituent unidirectional layer of intermediate material is in the range of 50 $g/m^2$ to 600 $g/m^2$, preferably in the range of 130 $g/m^2$ to 270 $g/m^2$. The surface density can notably be determined according to standard NF EN 12127 in its March 1998 version.

The intermediate product can consist of two, three, four, five or even more unidirectional layers. The reinforcement fibers extend parallel to each other within each unidirectional layer. But the orientations are different from one layer to another. In particular, the intermediate material of the invention is composed of unidirectional layers extending in different orientations selected among the angles 0°, 30°, 45°, 60°, 90°, 120°, 135°. All the layers or only some of them can have different orientations. For example, the intermediate product according to the invention can be produced using the following stacks: 0°/90°, 90°/0°, 45°/135°, 135°/45°, 90°/0°/90°, 0°/90°/0°, 135°/45°/135°, 45°/135°/45°, 0°/45°/90°, 90°/45°/0°, 45°/0°/90°, 90°/0°/45°, 0°/135°/90°, 90°/135°/0°, 135°/0°/90°, 90°/0°/135°, 45°/0°/135°, 135°/0°/45°, 45°/135°/0°, 0°/135°/45°, 45°/135°/90°, 90°/135°/45°, 135°/45°/0°, 0°/45°/135°, 135°/45°/90°, 90°/45°/135°, 60/0°/120°, 120°/0°/60°, 30°/0°/150°, 150°/0°/30°, 135°/0°/45°/90°, 90°/45°/0°/135°, 45°/135°/0°/90°, 90°/0°/135°/45°, 0°/45°/135°/90°, 90°/135°/45°/90°, 90°/135°/0°/45°, 45°/0°/135°/90°, 0° corresponding to the advance direction of the machine that makes it possible to produce the intermediate material according to the invention, and thus as well, to the general direction of the stitching yarns. FIG. 1 illustrates such an intermediate three-layer (triaxial) 45°/135°/0° product, assembled together by means of a stitching yarn f. The production of such multiaxials is known and makes use of conventional techniques, described for instance in the book "Textile Structural Composites, Composite Materials Series Volume 3" by Tsu Wei Chou & Franck. K. Ko, ISBN-0-444-42992-1, Elsevier Science Publishers B. V., 1989, Chapter 5, paragraph 3.3, or in patent FR2761380, which describes a method and a device for producing multiaxial fibrous layers. In particular, the unidirectional layers can be created before or deposited on line at the time the multiaxial is produced.

Figure 2:
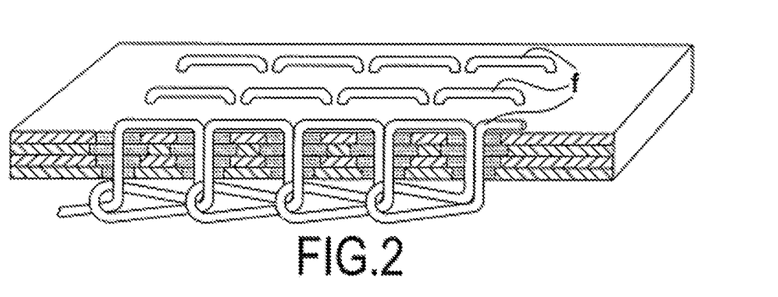
FIG. 2 is a perspective schematic view of an intermediate product according to the invention, consisting of a four-layer multiaxial showing a stitching method with chain stitches.

Binding by stitching or knitting can be performed by any known technique, notably by using a warp knitting machine, for instant with chain stitches ("chain stitch" in English) or lock stitches ("lock stitch" in English). FIG. 2 is a perspective schematic view of an intermediate product according to the invention, consisting of a four-layer multiaxial showing a stitching method with chain stitches.

Figure 3:
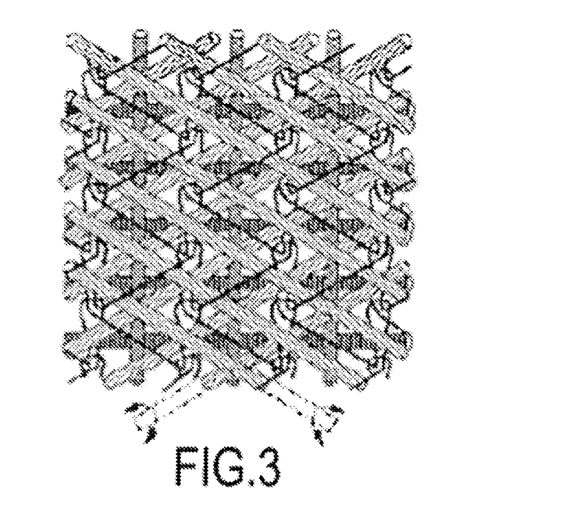
FIG. 3 is a top view of an intermediate product according to the invention, showing another stitching method with guide bar movement.

Binding by stitching or knitting of the various unidirectional layers can be achieved by stitches or by knitting extending in lines parallel to each other. Notably, the stitches or knitting points are spaced within the same row, preferably identically distant by 1 to 20 mm, and preferably 2 to 12 mm. Similarly, two consecutive stitching or knitting lines are, for example, spaced from each other by 2 to 50 mm, preferably 5 to 15 mm. Preferably, all consecutive stitching lines in a series of lines parallel to each other will be spaced by the same distance. An embodiment in which the bond between the layers is achieved by "zigzag stitching" with guide bar movement is shown in FIG. 3. Advantageously, the stitches will be sufficiently loose to avoid undesirable tension phenomena, a concept that is well known to the person skilled in the art. For example, in the case of chain stitches, a loose yarn can be characterized by an absorbed yarn length (LFA) of 3700 mm/m to 4000 mm/m for a four-layer multiaxial of 268 g/m$^2$.

The intermediate products according to the invention are adapted and intended to be used in combination with a resin matrix for the production of composite parts, particularly in the automotive, aviation, and naval fields. The implemented processes are direct processes. Such parts can exist in the form of laminates of varying complexity.

The creation of the composite part may require draping the intermediate product according to the invention, within a mold and possibly stacking it with other reinforcing materials. The stack may consist of several intermediate products according to the invention. Then, a thermosetting resin or matrix is added, for instance by injection into the mold containing the intermediate products ("RTM" process, Resin Transfer Molding in English), by infusion (into a mold, through the ply thickness: "LRI" process, Liquid Resin Infusion in English or "RFI" process, Resin Film Infusion in English), or else again by manual coating/impregnating with a roller or brush, on each of the intermediate products, applied successively on the mold being used.

The resin constituting the matrix is a thermosetting resin and can, for example, be selected among epoxies, unsaturated polyesters, vinyl esters, polyurethanes, phenolics, polyimides, bismaleimides, and mixtures thereof. It can contain plasticizing additives or particles of thermoplastic polymers, or any other additive conventionally used with thermosetting resins implemented for the production of composite parts, particularly in the aviation field.

Finally, the composite part is obtained using a conventional cycle of heat treatment of the polymers being considered, recommended by the suppliers of these polymers, and known to the person skilled in the art. This later stage of heat treatment, leading to corresponding polymer thermoset is conventionally used in the various prior art processes for producing composite parts. The direct processes conventionally used to produce composite parts from fibrous reinforcements, notably the temperature and pressure conditions, are directly transferable to the creation of the intermediate products according to the invention.

The intermediate products according to the invention are particularly suited to the production of composite parts in the aviation field, notably structural parts used in aviation, such as fuselage frames, wing skins, fuselage skins, fin skins, horizontal tail skins, bulkheads, wing spar boxes, reactor blades. The parts obtained have smaller resin-rich zones and the occurrence of microcracks under hygrothermal stresses is very limited. Notably, these parts have resin-rich zones at the stitching yarns, whose height, measured in a plane parallel to the unidirectional layers that constitute the stitched stack and located at the middle of the stack, is at most equal to 0.11 mm. The stitched stack corresponds to an intermediate product according to the invention. For example, in the case of a stack of four unidirectional stitched layers composing a portion of the part, the measurement is thus performed on a plane between the two center plies (which corresponds to the middle of the stack thickness), and in the case of a stack of three unidirectional stitched layers, the measurement is performed on a plane located in the middle of the central layer. In this plane, the resin-rich zone, which most often can be roughly likened to an ellipse, has a larger dimension that defines a major axis. In this same plane, the height is the largest dimension of the resin-rich area, measured along an axis perpendicular to its major axis.

The following examples make it possible to illustrate the invention, but are not limiting in nature.

Microcracking behavior was studied for a laminate composed of four layers of quasi-isotropic B/S/B/S multiaxials, with B: [45°/0°/135°/90°] and S: [90°/135°/0°/45°]. The stack is then written in abbreviated form as [[45°/0°/135°/90°]$_s$]2

Each unidirectional layer of a multiaxial consists of Tenax HTS 5631 fibers with a surface density of 268 g/m$^2$. Each multiaxial is stitched with a 5 mm pitch and the distance between two lines of stitching is also 5 mm, the type of stitching is a "chain stitch"("chain stitch" or "open pillar stitch" in English). The length of absorbed yarn (LFA) is 3800 mm/m.

Four stitching yarns were studied:
Example 1 according to the invention: Polyester 23 dTex (Grilon K E-160 from EMS-CHEMIE, CH-7013 Domat, Switzerland)
Comparative example 2: Polyester 49 dTex, type 712 from INVISTA (INVISTA Resins & Fibers GmbH & Co. K G, Werk Bad Hersfeld, Berliner StraBe, 36251 Bad Hersfeld, Germany).
Comparative example 3: Polyester 35 dTex (511W from Trevira GmbH, Guben 03172, Germany)
Comparative example 4: Polyhydroxyether (phenoxy) 150 dTex (from EMS-CHEMIE, CH-7013 Domat, Switzerland).

The stitching yarns are delivered washed by the supplier or have a very low lubrication weight factor. Thus, the yarns being used have the following lubrication weight factors:
23 dTex: weight factor <1.2%
35 dTex: weight factor: 0% (from the product specifications)
49 dTex: weight factor <0.1%
76 dTex: weight factor: 0% (from the product specifications)

The stitching yarns being used have the tenacity and elongation at rupture presented in TABLE 1.

TABLE 1

| Nominal values | | |
| --- | --- | --- |
| EN ISO 2060-June 1995 Count dTex | EN ISO 2062-1995 Fracture toughness cN/Tex | EN ISO 2062-1995 Rupture elongation % |
| 23 | 25 | 55 |
| 35 | 40 | 19 |
| 49 | 71 | 16 |
| 76 | 42 | 21 |

Each studied laminate is thus composed of four layers of multiaxials, each multiaxial consisting of four unidirectional layers stitched together with the yarns defined above.

The laminate is fabricated as follows: the four B/S/B/S sequences are cut, carefully maintaining the 0° orientation (that of the machine and therefore of the stitches) identical for the four plies. The plies are then stacked to form a preform of 340 mm×340 mm. The latter is then placed in an injection mold in a press. A frame with a thickness of 4 mm surrounds the preform in order to obtain a volume fiber ratio (VFR) of 60%.

The epoxy resin sold as HexFlow RTM6 by Hexcel is injected at 80° C. at 200 kPa (2 bars) through the preform, which is maintained at 120° C., the temperature of the press platens. The pressure applied to each of the two press platens is 500 kPa (5 bars). When the resin appears at the outlet of the mold, the outlet tubing is closed and the polymerization cycle begins (increased to 180° C. at 3° C./min, then maintained for 2 hours at 180° C., then cooled at 5° C./min).

The laminates are subjected to one or several hygrothermal cycles, intended to simulate the thermal cycles and the humidification periods to which an aviation part may be subjected.

Test samples of 50 mm×60 mm×4 mm are cut in order to undergo the following hygrothermal cycle. Each specimen is then cut again, then polished, to count the cracks that appear during the application of the cycle.

Figure 4:
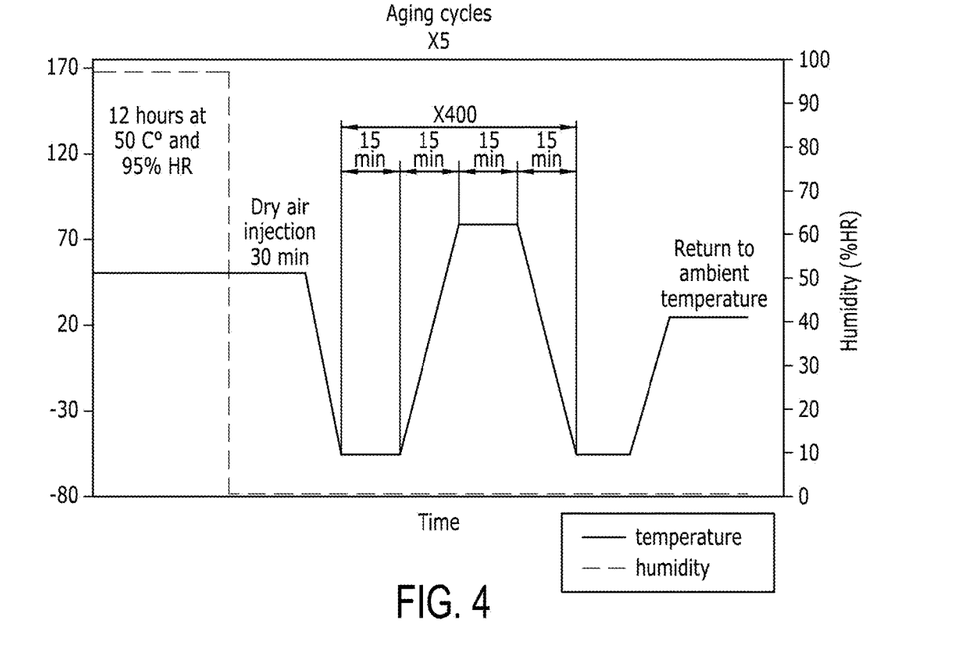
FIG. 4 shows the hygrothermal cycle for testing laminates according to the invention.

Hygrothermal Cycle:

The hygrothermal stress includes several repetitions of two phases: a stationary phase of moisture absorption at 50° C. and 95% humidity, followed by one hour thermal cycles. These thermal cycles consist of a plateau for a quarter hour at −55° C., followed by a temperature change for 15 minutes to reach a temperature of 80° C., followed by a plateau for a quarter hour at 80° C., followed by a new phase of temperature change for 15 minutes to return to −55° C. The negative temperature was chosen because it corresponds to that experienced by an aircraft in subsonic flight. The positive temperature is intended only to accelerate the moisture desorption. The hygrothermal cycle is shown in FIG. 4.

The stress, through its humidification period causes a gradient of water concentration within the sample. This concentration profile is different on the edges of the sample because the diffusion coefficients are higher in the direction of the fibers. Since the fiber orientation is different in each unidirectional ply, the diffusion coefficients are also different, generating a very complex water concentration profile on the edges of the sample. This phenomenon was taken into account for dimensioning the sample and defining the zone to be studied.

The hygrothermal cycles are produced in a "CTS (Climatic Testing System)", model CS-70/280-15 enclosure from Climatique et Thermique Service (ZAC du Pujol, 13390 Auriol, France), including cooling with a two-stage liquid refrigerant expansion system. A cooling unit model Type 30 RA-040-B 0327-PEE from Carrier (CARRIER S. A. S. Route du Thil 01122 Cedex Montluel) circulates a large volume of recycled glycol-water at 10° C. in the first stage of the environmental chamber cooling system to assure its operation. Such a device assures a cooling rate of 10° C./min even at temperatures below −50° C., which is close to the operating limit of the chamber, set at 180° C. to −70° C.

The humidity in the working volume of the enclosure is controlled and adjusted using a dew point generator. A ZANDER K-MT1 dryer by injection of dry air, from ZANDER (45219 ESSEN, Germany), was added to this equipment. Once the humidity of the dryer is set at 0%, the volume is considered completely dry.

A protocol for sample preparation was established to count the cracks by microscopic observation after the hygrothermal cycle. The only direct method to observe internal microstructures, such as microcracks in a material, is to cut and polish the cutting plane. This method is very widespread. It consists of using cloths and diamond suspensions to abrade the surface to an increasingly fine polish in order to obtain the flatness required for a good analysis.

Figure 5:
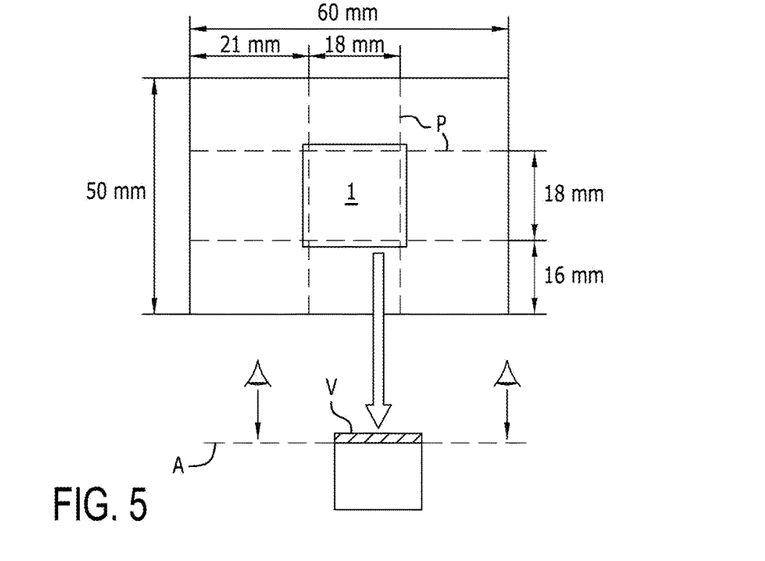
FIG. 5 shows the cutting profile of example 1, at the core of the test pieces.

A decision was made to use samples of 5×6 cm², in which the stitching lines are parallel to the 5 cm side. Two equivalent observation planes are thus available. Cuts as shown in FIG. 5 are made in each sample that has undergone a hygrothermal cycle. The central example 1 is observed on the observation planes presented in FIG. 5, after polishing The cut planes are not located on the stitch so as to allow an adjustment of the observation plane during the polishing.

Figure 6:
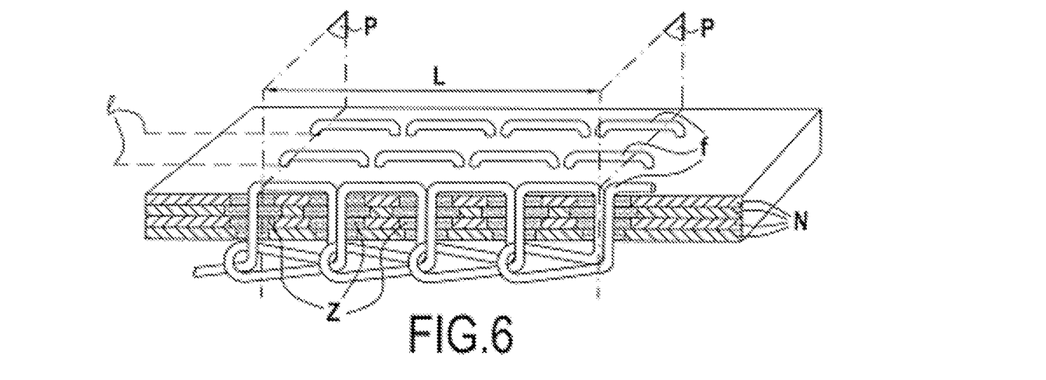
FIG. 6 shows the position of the observation plane, defined by the cutting plane, with respect to the stitch points and the unidirectional layers.

The location of the cut planes P, with respect to the stitching yarns f and to the unidirectional layers N is shown in FIG. 6. The planes P are perpendicular both to the stitching lines l and to the plane of the unidirectional layers N. The shaded areas Z represent the resin-rich zones at the stitches.

The method of polishing the samples to a mirror finish suitable for observation, has been simplified compared to a metal, in the step that uses a coarse paper because of its greater ductility. But a more polished finish, interspersed with ultrasonic bath cleaning, is required during the final polishing stage using a diamond suspension.

The periodicity of the resin-rich areas due to the periodicity of the stitches that assure the bonding of the unidirectional layers within the multiaxials composing the laminate, required the development of a protocol to control the location of the observation plane. Indeed, to study what happens in the stitching zones, it is necessary to focus the study in the zone of interest. To this end, it was decided to roughly determine the location of the cut plane and to adjust the position of
the observation plane with respect to the zone of interest thanks to the abrasion during the polishing This method allows a precision of about 20 microns for the position of the cut plane, precise enough to conduct the study.

First, the test samples for example 1 are cut with a silicon carbide circular saw. This cut is obtained by progressive abrasion with calibration of the advance speed of the blade.

Then, the polishing protocol below, which enables a mirror finish suitable for microscopic observation, is implemented at the cut plane.

Polishing Protocol

The samples are embedded in LamPlan 605 resin (acrylic resin polymerized with methyl methacrylate) and polished with an automatic pressure independent polishing machine (Mecapol P320 from Presi). For this, the cut samples are placed at the bottom of a cylindrical mold. The surface to be polished is oriented toward the bottom of the mold. The mold is then filled with a two-component cold mounting resin (LamPlan 605) that polymerizes spontaneously in about 15 min. The samples are then removed from the molds and polished using the described protocol.

The various stages of the polishing are given in Table 2.

TABLE 2

| step number | paper grit | pressure per sample | minimum time |
|---|---|---|---|
| 1 | P240 | 250 g/cm$^2$ | 40 s |
| 2 | P600 | 250 g/cm$^2$ | optional |
| 3 | P1000 | 250 g/cm$^2$ | 50 s |
| | 3 min in ultrasonic bath | | |
| step number | diamond suspension | pressure per sample | time |
| 4 | 3 μm | 100 g/cm$^2$ | 7 min |
| | 3 min in ultrasonic bath | | |
| 5 | 1 μm | 100 g/cm$^2$ | 5 min |

In steps 1, 2 and 3 the automatic polishing machine has a speed of 150 revolutions per minute in contra rotation for the plate and a maximum speed for the head (100 rpm). Impurities are removed with running water.

In steps 4 and 5 the automatic polishing machine has a speed of 300 revolutions per minute in contra rotation for the plate and a maximum speed for the head (100 rpm). The impurities are then removed with a lubricant introduced drop by drop.

The cracks are then counted by analyzing micrographic images obtained with a 5 megapixels digital camera (Olympus model U-TVO.5XC-2-4F04335) mounted on a microscope (Olympus model GX 51 F-T2 SN 4 G 0 9299) with an ×5 objective (×50 magnification). The image analysis software is "Analysis Pro Five", marketed by Olympus France SAS, Parc d'affaire Silic, 74 Rue d'Arcueil BP 90165, 94533 Rungis Cedex, France.

For the observation of Ni cracks in the unidirectional sheet i on a sample of length L with a draping that leaves visible the cracks in p unidirectional layers, a criterion d is defined by the equation:

$$d = \frac{\sum_i N_i}{L \times p}$$

Factor p is the total number of unidirectional layers of the laminate less the number of unidirectional layers whose carbon fibers are parallel to the observation plane, given that the cracks remain invisible in these unidirectional layers.

Factor d is a linear density of cracks, expressed in cm$^{-1}$, which depending on the choice of L, can be regarded as an intrinsic characteristic of the material under the stress being considered.

In the multiaxials, observation shows that cracks propagate in a completely original manner: the zones of homogeneous resins within the heterogeneous sample allow the cracks to leave the orientation imposed on them by the fibers, and to reorient themselves from one ply to another.

Figure 7:
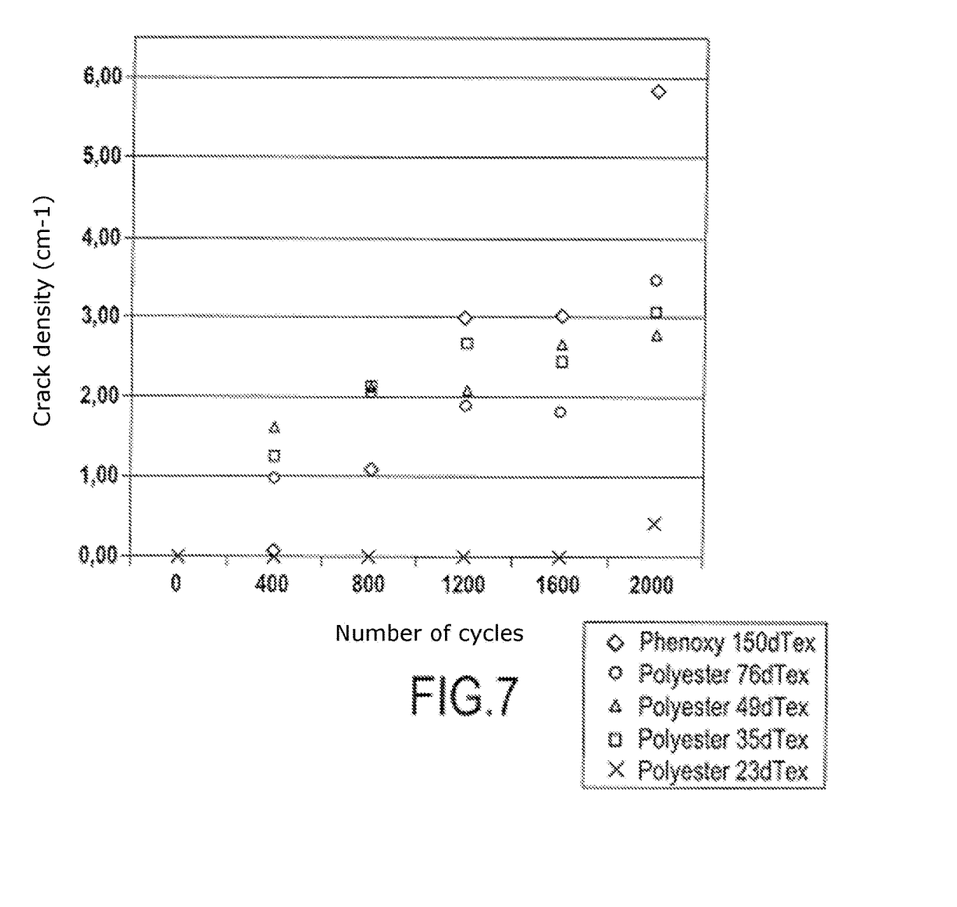
FIG. 7 shows the values of the d factors obtained on different samples after a specified number of hygrothermal cycles.

The graph in FIG. 7 shows the values of the d factors (called crack density) obtained on different samples (given that the measurement method is destructive), after a determined number of hygrothermal cycles. It is clearly shown that the laminates according to the invention, which use a yarn of 23 dTex polyester, have a much lower crack density.

Figure 8:
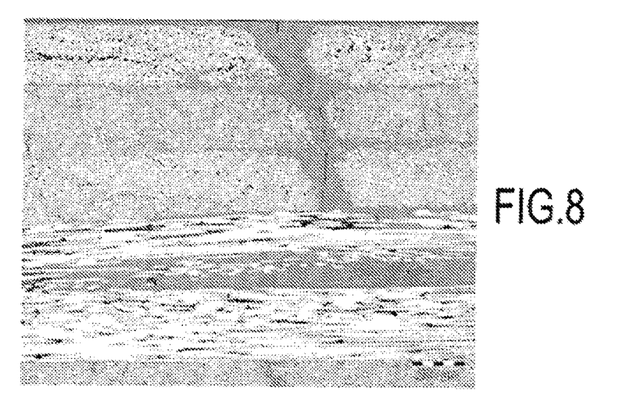
FIG. 8 is an image of a microcrack obtained with the laminate of the comparative example 3 (35 dTex polyester) after 400 hygrothermal cycles.

FIG. 8 is an image of a microcrack obtained with the laminate of the comparative example 3 (35 dTex polyester) after 400 hygrothermal cycles.

It was also shown that crack density is lower in laminates with smaller rich zones, since the size of the resin-rich zones is primarily dependent on the count of the yarn used to stitch the different layers.

Laminates prepared with layers stitched with 150, 76, 49 and 35 dTex, have all shown a susceptibility to crack as early as 400 thermal cycles (800 in the case of 150 dTex phenoxy yarn).

Only the laminate prepared with layers stitched together with 23 dTex polyester yarn did not crack before 1600 thermal cycles.

Figure 9:
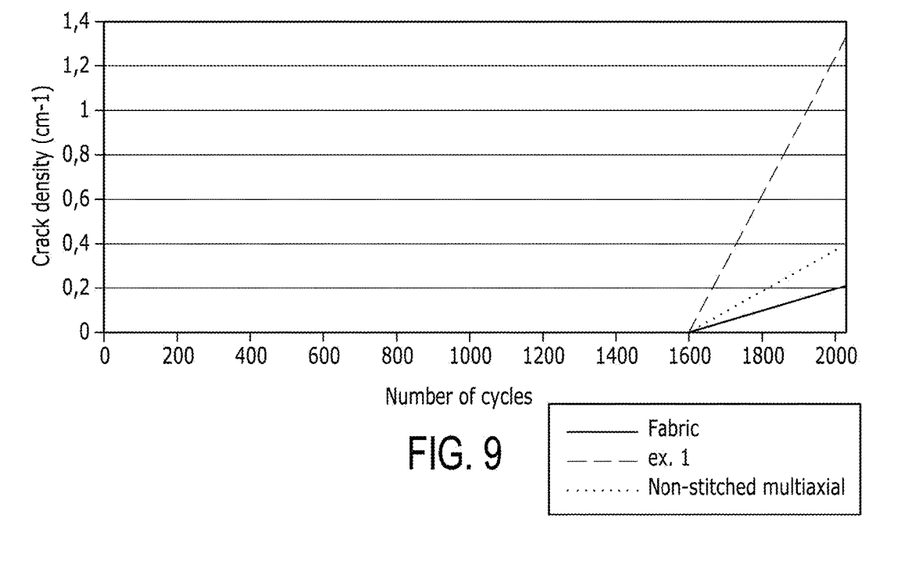
FIG. 9 shows the evolution of crack density as a function of the number of hygrothermal cycles in the case of the example 1 laminate, and of its counterpart produced with unidirectional fabrics (so called because only one direction is woven with reinforcement fibers and marketed as G1157 by Hexcel), the fabric grammage being equivalent to the grammage of a unidirectional layer of the example 1 multiaxial, and its counterpart produced with non-stitched multiaxial layers.

FIG. 9 shows the evolution of crack density as a function of the number of hygrothermal cycles in the case of the example 1 laminate, and of its counterpart produced with fabrics whose grammage is equivalent to a layer of the multiaxial, and of its counterpart produced with non-stitched multiaxial layers.

It appears that the occurrence of cracks in the laminate according to the invention coincides with the occurrence of cracks in non-stitched materials. It thus seems that two modes of cracking coexist, one specific to stitches, and the other specific to composite materials as a whole. Moreover, in the case of the laminate according to the invention, cracks are located primarily in stitching zones until 1600 thermal cycles, while at 2000 thermal cycles, cracks are no longer located only in stitching zones, but are also present outside resin-rich zones.

Such a result highlights the contribution of the invention: the 23 dTex stitching yarn actually makes it possible to minimize the occurrence of cracks, since cracks that occur after 1600 cycles are not due to the stitching, but to the actual nature of the composite material.

The characteristic dimensions of resin-rich zones are measured directly by optical micrography. The embedding and polishing protocol used to obtain a surface suitable for observation is the same as that used for the microcracking characterization. The control of the sample volume abraded during polishing, used in the previous case to locate the study of stitches, is used here to measure the characteristic dimensions of plies at the same referenced position within the multiaxial layer, that is to say, at the same distance from the stitch loops.

Sample preparation, however, differs by the size of the sample and its orientation in the embedding pin. The samples are cut directly from the plate without thickness modification. The sample size is therefore 2×2 cm² for the surface being studied.

The cut samples are placed at the bottom of a cylindrical mold of 32 mm in diameter. The surface to be polished is oriented toward the bottom of the mold. The sample is therefore placed flat and not on edge as it is for characterizing internal microcracking.

Figure 10:
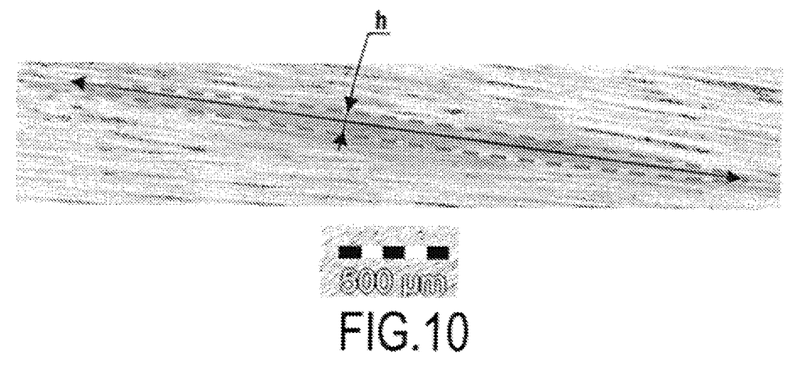
FIG. 10 shows a resin-rich zone at a stitch for the example 1 laminate.
Figure 13:
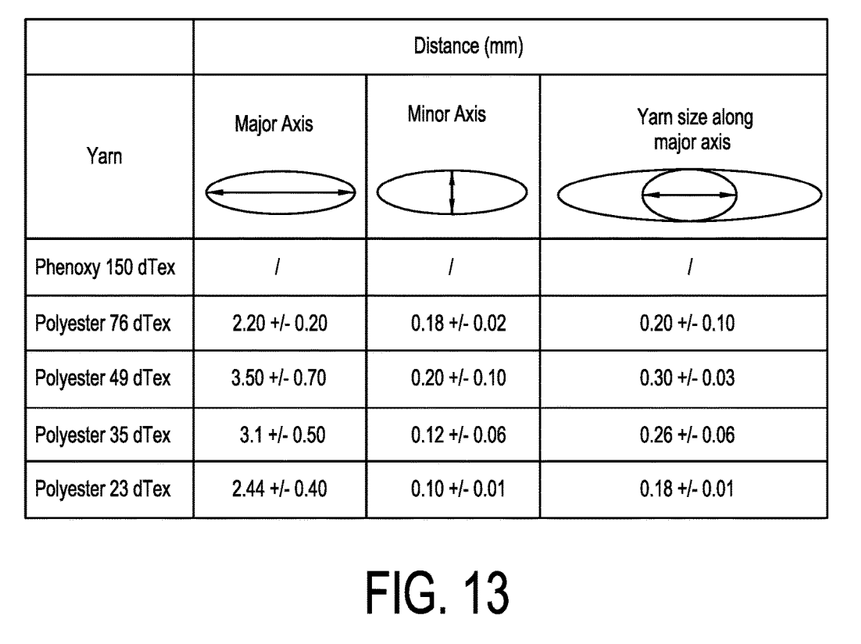
FIG. 13 shows the dimensions of the resin rich zones for different yarns.

The dimensions of the resin-rich zones at the stitches were measured on micrographic images obtained with a 5 Megapixel digital camera (Olympus model U-TVO.5XC-2-4F04335) mounted on a microscope (Olympus model GX51 F-T2SN 4 G 0 9299) with an ×5 objective (×50 magnification) according to three criteria defined in FIG. 13. The image analysis software is "Analysis Pro Five", marketed by Olympus France SAS, Parc d'affaire Silic, 74 Rue d'Arcueil BP 90165, 94533Rungis Cedex, France. The measurements are performed directly on the image by entering into the processing software the magnification used for capturing the image. Given the polishing plane, the images are obtained from a plane parallel to the unidirectional layers of the intermediate product and located at the middle of the intermediate product. These measurements are taken along two main axes: the major axis and the minor axis of the lenticular zone. FIG. 10 shows a resin-rich zone at a stitch for the example 1 laminate produced with a 23 dTex yarn, and highlights the major axis and the height h on the minor axis of the zone. The major axis is defined by the straight line through the two ends of the lenticular zone and the minor axis is perpendicular to the preceding axis. The minor axis (also called height h) is located at the point of its maximum value.

Four measurements were made per sample, for each type of stitching. FIG. 13 presents the averages of the obtained values with their standard deviations. It appears that the main difference between the yarns, in terms of inclusion measurements, is the "height" of the resin-rich area. By "height", we mean the minor axis of that which could be likened to an ellipse, as defined above, and which delimits the resin-rich zone formed by the passage of the stitching yarn through the stitched stack, being considered, in a plane parallel to the unidirectional layers constituting the stack and located at the middle of this stack.

For the laminate according to the invention, the "height" of the resin-rich zone is 0.10 mm.

Figure 11:
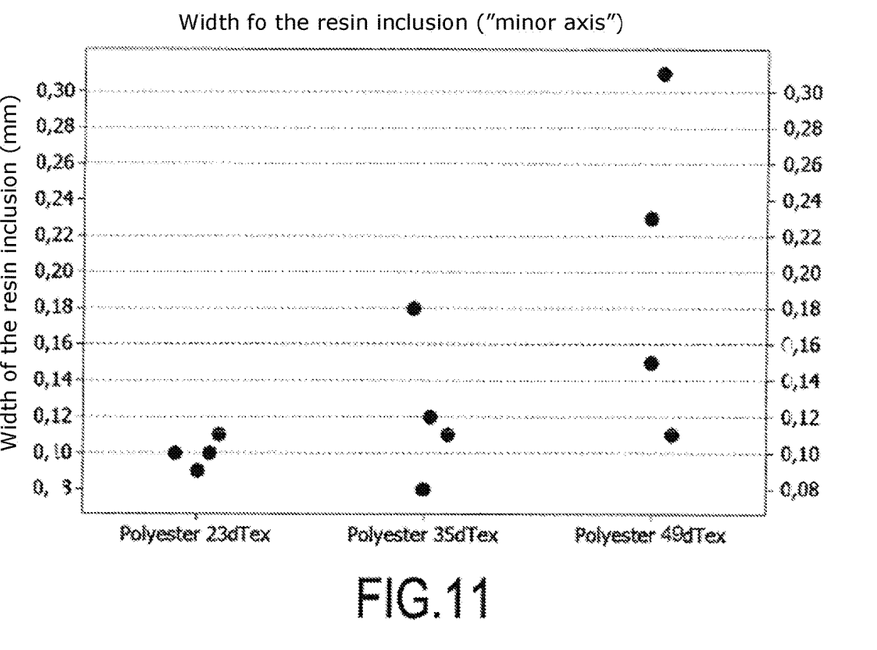
FIGS. 11 and 12 show the "minor axis" dimensions corresponding to the height of a resin-rich zone at a stitch in the case of laminates, as a function of the count and nature of the yarn being used.
Figure 12:
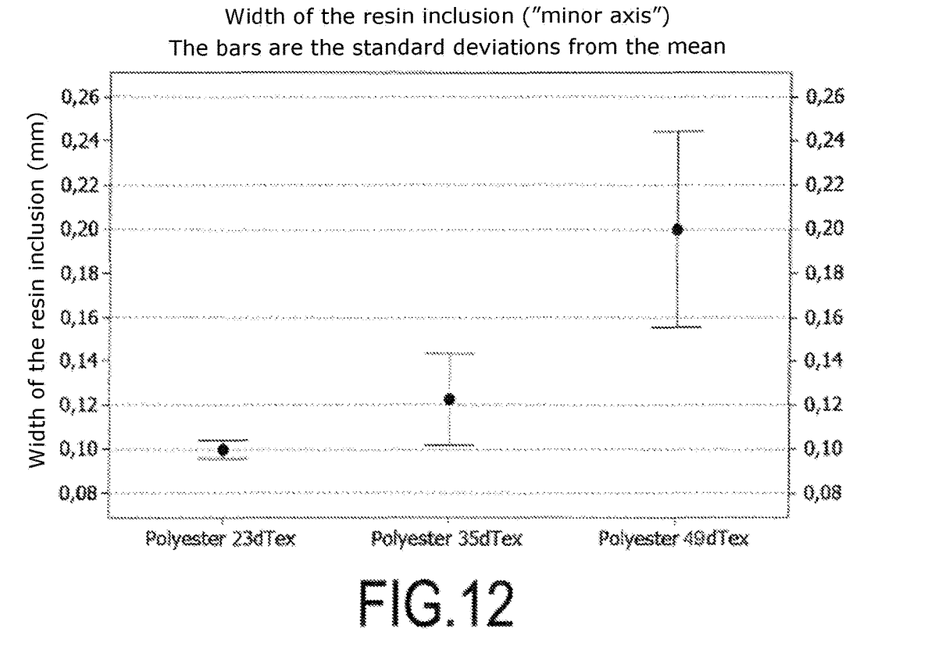

The different results obtained are shown in FIGS. 11 and 12, and clearly show that the 23 dTex yarn creates the smallest heights of resin-rich zones.

In these figures, it also appears that up to 50 dTex, the dispersion of heights in resin-rich zones becomes greater as the yarn count increases.

The invention claimed is:

1. A composite part comprising two layers that each comprises unidirectional fibers selected from the group consisting of carbon fibers, glass fibers, basalt fibers, aramid fibers, silica fibers, ceramic fibers and mixtures thereof, said layers being located next to each other such that the unidirectional fibers of one layer extend in a direction that is different from the other layer, said layers being bonded together by a polyester stitching yarn that has a count of less than or equal to 30 dTex, as determined according to the EN ISO 2060 standard and a cured resin matrix wherein an elliptical cured resin-rich zone is located at said stitching yarn, said elliptical cured resin-rich zone having a major axis that extends through the two ends of the elliptical cured resin-rich zone and a minor axis or height that extends perpendicular to said major axis, said height being 0.09 mm to 0.11 mm and wherein said composite part exhibits a crack density of 0 after being subjected to 1600 hygrothermal cycles.

2. A composite part according to claim 1 wherein said polyester stitching yarn has a moisture absorption factor of less than or equal to 0.4%, as determined by the ASTM D629-99 (paragraph 9) standard.

3. A composite part according to claim 1 wherein said cured resin matrix is selected from among epoxies, unsaturated polyesters, vinyl esters, polyurethanes, phenolics, polyimides, bismaleimides, and mixtures thereof.

4. A composite part according to claim 1 wherein said polyester stitching yarn has a fracture toughness between 20 cN/Tex and 100 cN/Tex, as measured according to the 1995 version of EN ISO 2062.

5. A composite part according to claim 1 wherein said polyester stitching yarn has a rupture elongation between 10% and 60%, as measured according to the 1995 version ISO EN 2062.

6. A composite part according to claim 1 wherein said, polyesters stitching yarn has a count that is equal to 23 dTex.

7. A composite part according claim 1 wherein the surface density of each of said layers is in the range of 50 g/m² to 600 g/m², as determined according to the March 1998 version of standard NF EN 12127.

8. A composite part according to claim 1 wherein said layers are bonded together by stitches or knitting of said polyester stitching yarn that extend along parallel lines.

9. A composite part according to claim 8 wherein said layers are bonded together with said polyester stitching yarn such that stitching or knitting points are formed that are spaced linearly apart by 1 to 20 mm and wherein said parallel lines are 2 to 50 mm apart.

10. A composite part according to claim 1 wherein said unidirectional fibers extend in directions selected from among the angles 0°, 30°, 45°, 60°, 90°, 120°, 135°.

11. A composite part according to claim 1 wherein said composite part is an aircraft part selected from the group consisting of fuselage frames, wing skins, fuselage skins, fin skins, horizontal tail skins, bulkheads, wing spar boxes, reactor blades.

12. A composite part according to claim 1 wherein the length of the major axis that extends through the two ends of the elliptical cured resin-rich zone is from 2.0 mm to 2.8 mm.

13. A composite part according to claim 1 wherein the stitching yarn size along said major axis is from 0.17 mm to 0.19 mm.

14. A composite part according to claim 1 wherein said polyester stitching yarn has a count of less than or equal to 25 dTex.

15. A process for making a composite part comprising the steps of:
providing an intermediate product that comprises at least two layers of unidirectional reinforcement fibers selected from the group consisting of carbon fibers, glass fibers, basalt fibers, aramid fibers, silica fibers, ceramic fibers and mixtures thereof, said layers being stitched together using at least one polyester stitching yarn wherein said polyester stitching yarn has a count of less than or equal to 30 dTex, as determined according to the EN ISO 2060 standard and a thermosetting resin; and curing said thermosetting resin to form a cured resin matrix wherein an elliptical cured resin-rich zone is located at said stitching yarn, said elliptical cured resin-rich zone having a major axis that extends through the two ends of the elliptical cured resin-rich zone and a minor axis or height that extends perpendicular to said major axis, said height being from 0.09 mm to 0.11 mm and wherein said composite part exhibits a crack density of 0 after being subjected to 1600 hygrothermal cycles.

16. A process according to claim 15 wherein said thermosetting resin is selected from the group consisting of epoxies, unsaturated polyesters, vinyl esters, polyurethanes, phenolics, polyimides, bismaleimides, and mixtures thereof.

17. A composite part that is made according to the process of claim 15.

18. A composite part according to claim 17 that comprises more than two layers of unidirectional fibers.

19. A composite part according to claim 17 wherein said composite part is an aircraft part selected from the group consisting of fuselage frames, wing skins, fuselage skins, fin skins, horizontal tail skins, bulkheads, wing spar boxes, reactor blades.

* * * * *